Sept. 22, 1964   D. V. ANDERSON ETAL   3,149,371
METHOD FOR REMOVING THE MEAT FROM KING CRAB LEGS
Original Filed March 20, 1961   6 Sheets-Sheet 5
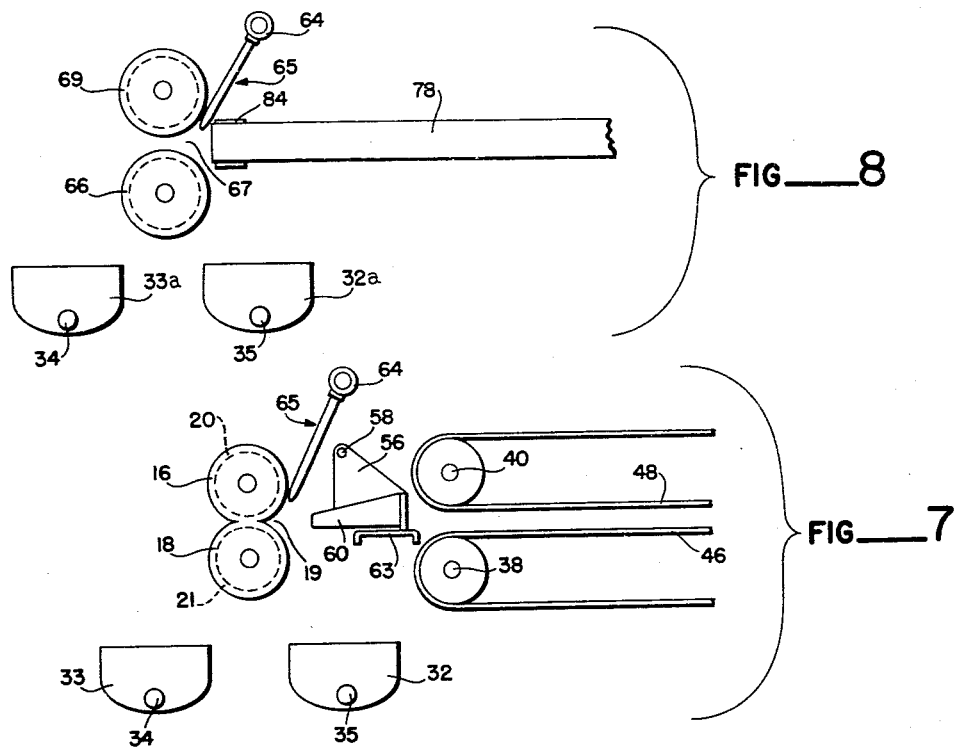
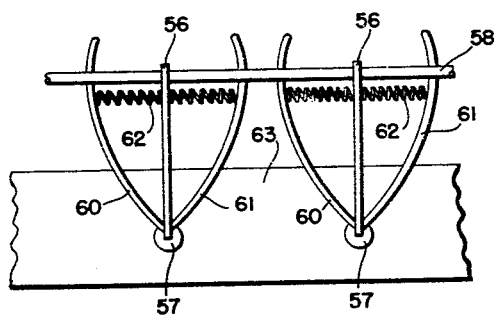
DONALD V. ANDERSON
JAMES G. GILLMAN
INVENTOR.
BY
ATTORNEY

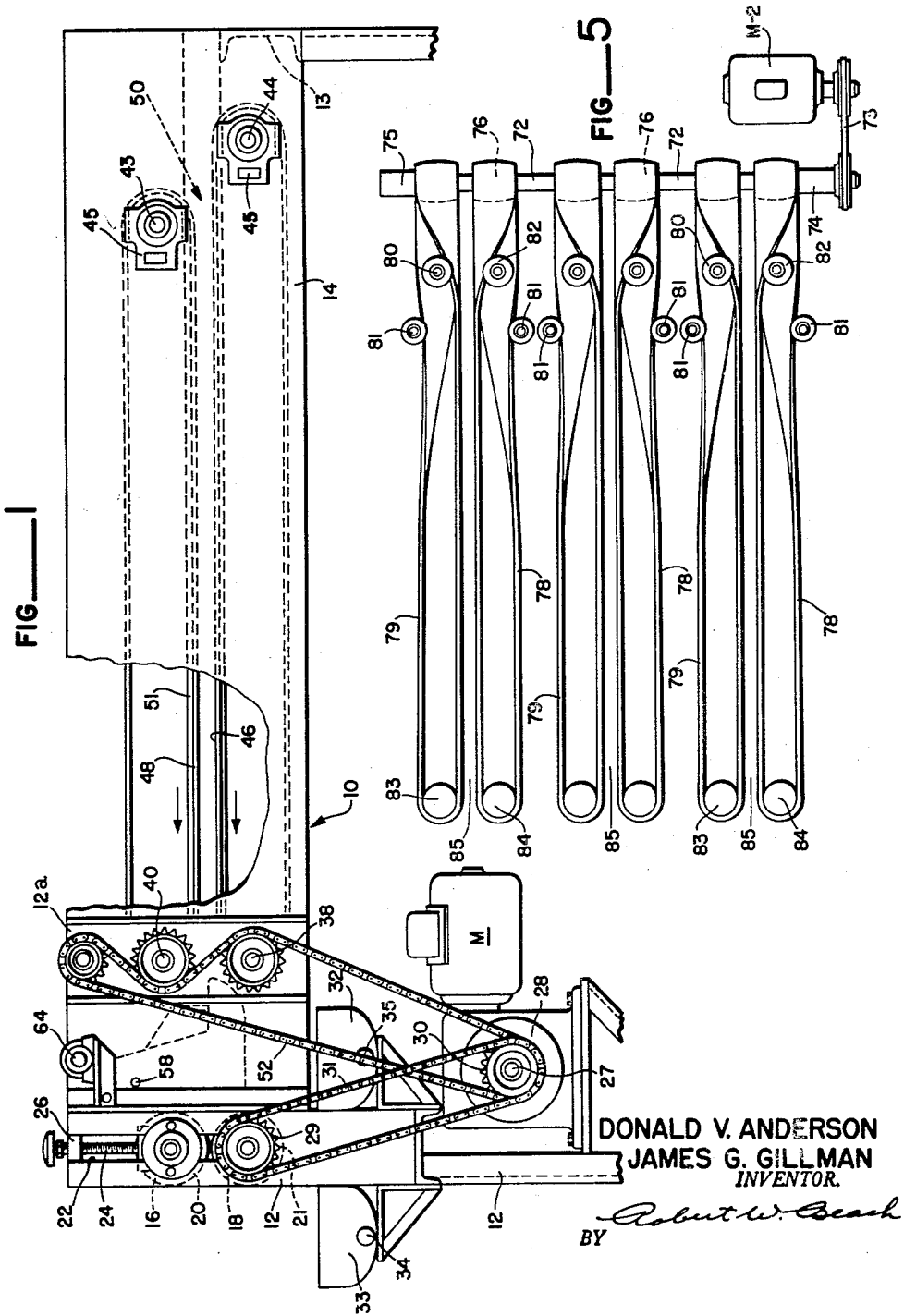

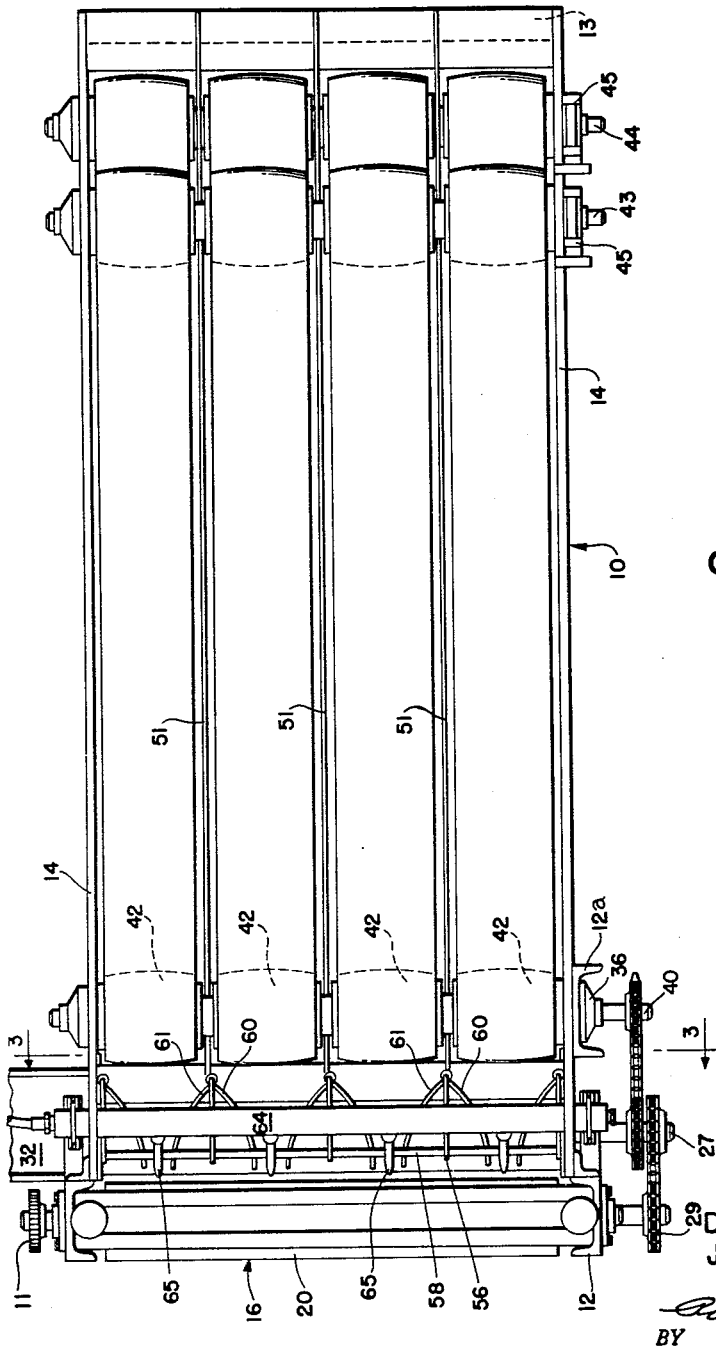

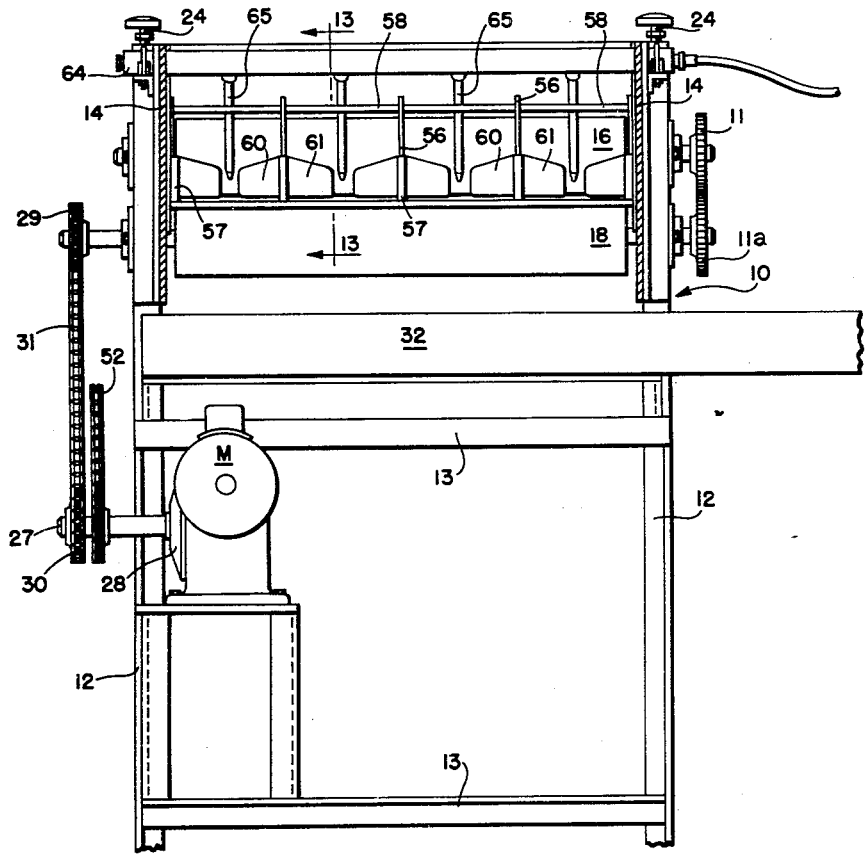
FIG—3
DONALD V. ANDERSON
JAMES G. GILLMAN
INVENTOR.
BY
ATTORNEY

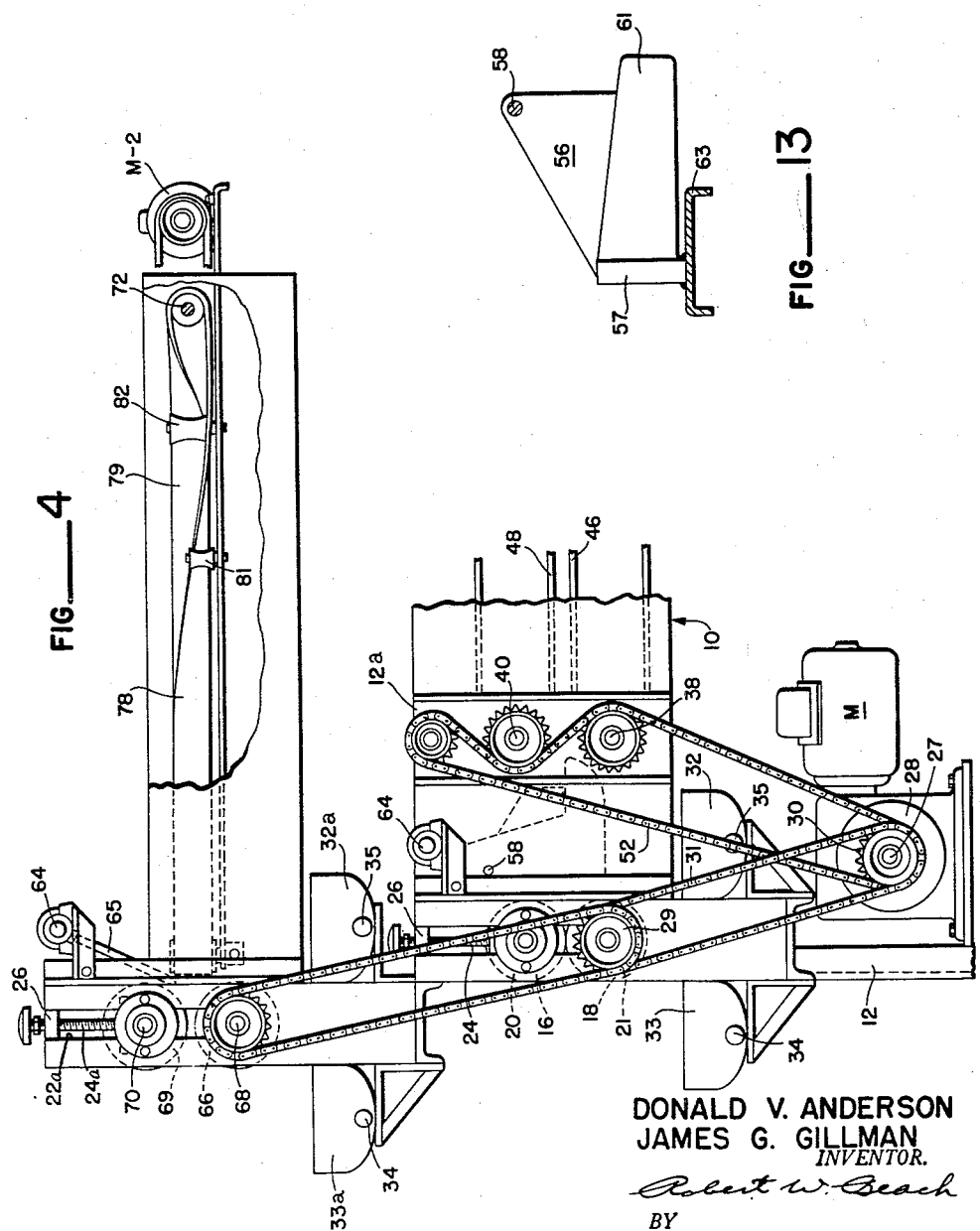

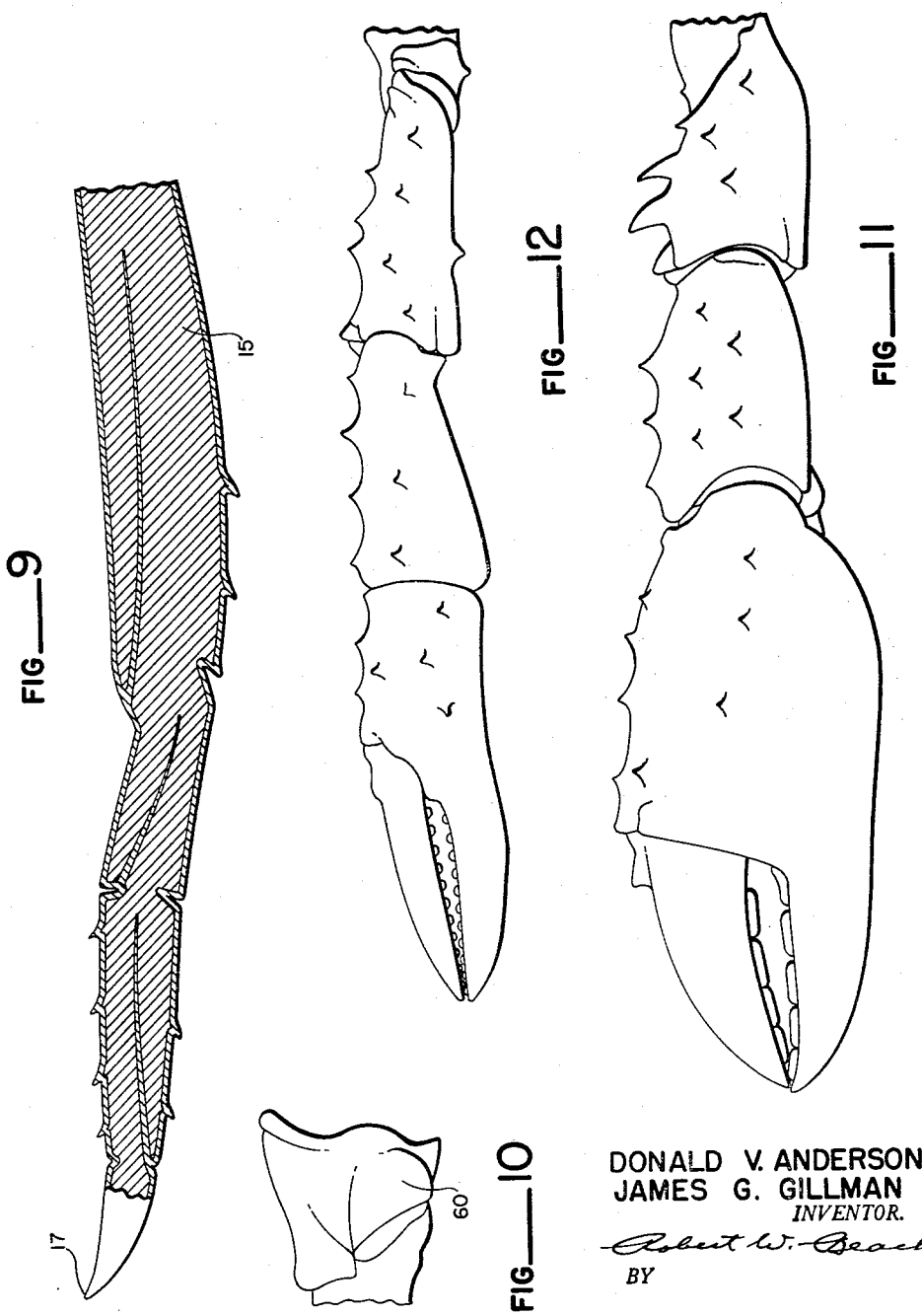

United States Patent Office 3,149,371
Patented Sept. 22, 1964

3,149,371
METHOD FOR REMOVING THE MEAT
FROM KING CRAB LEGS
Donald V. Anderson, % P.A.F. Cannery, Lazy Bay, Alitak, Kodiak Island, Alaska, and James G. Gillman, 113 Lake St., Kirkland, Wash., assignors of thirty percent to Wayne Luders and ten percent to Paul D. Jackson
Original application Mar. 20, 1961, Ser. No. 97,090. Divided and this application May 3, 1963, Ser. No. 277,803
6 Claims. (Cl. 17—45)

The method of the present invention relates to the removal of meat from king crab legs, such as by utilization of the device disclosed in this application and our copending application Serial No. 97,090, filed March 20, 1961, and now abandoned, for Device for Removing the Meat From King Crab Legs, of which this application is a division.

More specifically this method comprises squeezing the meat out of the long legs of king crabs by passing them between cooperating resiliently-faced rollers. The axes on which such cooperating rollers revolve are fixed with respect to each other. The machine preferably combines two coacting pairs of rollers, one pair of which is in contact throughout its length to accept the long section of the leg and the second coacting pair is spaced apart, still on fixed spacings, to accept the large knuckle portion at the large end of the leg and the claws, both of which are larger in diameter than the legs of the crab. Means can be combined with such rollers for the accurate and remote feeding of the crab parts into the coacting pairs of rollers and means can be provided for the proper orientation of the legs just before they are presented to the roller. Alternatively, the crab leg can be fed to and oriented with respect to the rollers by hand.

In the past the removal of the edible meat from the king crab legs has presented a most unusual problem which heretofore has been met largely by hand operation, which is very wasteful of the crab meat; the hand operation is normally aided only by supplying some means for introducing a jet of air, or preferably of water at the small end of the leg, which was cut off for this purpose, and in this way the meat was blown out of the legs. This means, however, presented a considerable problem as applying pressure to the end of a column of meat which might be from twelve to eighteen inches long caused a compacting of the meat and added to the difficulty of forcing it out of the long tubular shell. A further complication was caused by the presence of long tough tendons throughout the length of the legs. The meat of the crab legs is largely muscular and to tie these muscles to the joints of the legs so that the joints can be manipulated, nature has provided long tough tendons which can be likened to the large tendons of a turkey leg, except that those of the king crab are longer. These tendons are themselves tapering and the large end is secured to the shell of the leg with the free end of the tendon normally bonded to the muscles and extending upwardly to the large end of the crab leg. As a result of the difficulties involved in the removal of the meat from the king crab legs, the average person could remove only about sixty pounds of meat per hour, and a very experienced person, working under the most ideal conditions could only remove as much as one hundred pounds per hour.

It naturally follows that the necessity for so much manual labor in the removal of the meat added materially, not only to the cost of processing the meat, but also to the price paid by the ultimate consumer. The meat of the king crab is of good size and is an excellent food, but the difficulty and expense of processing it has in the past greatly curtailed its commercial sale. By the present method we have solved many of the problems encountered in this industry and this should result in an appreciable reduction in the cost of processing, which will in turn make this excellent food more generally acceptable to the average family.

The principal object of this present invention, therefore, is to provide a method in which resilient pressure is applied to the small end of the crab leg by means of coacting rollers so that the meat will be squeezed out of the full length of the shell of one leg, normally in a single connected piece.

A further object of this invention is to provide a method for the pressure expulsion of the edible meat from a crab leg wherein the pressure is applied to the meat at the large end of the various tendons in the progressive removal of the same so that the meat is stripped off of the tendons and out of the shell, thus making it possible to obtain all of the meat from a single leg as one connected piece.

A further object of this invention is to perform such method by the use of resiliently faced rollers which operate with a fixed spacing between them.

A further object of this invention is to present the small end of the crab leg to the pressure rollers oriented in a manner to insure most satisfactory removal of the meat.

A further object of this invention is to utilize two coacting pairs of rollers which are spaced apart, yet located close enough together that a person can selectively feed a portion of a crab leg to the set of rollers that can best extract the meat from the particular portion of the crab leg which he happens to have in hand at that instant.

FIGURE 1 is a side elevation of a crab leg meat extracting machine which can be utilized in the performance of the method of the present invention on legs of the crab after the knuckles have been removed, with parts broken vaway.

FIGURE 2 is a top plan view of the device shown in FIGURE 1 with certain parts removed for clarity in showing the belt arrangements.

FIGURE 3 is a transverse, vertical, sectional view taken along the line 3—3 of FIGURE 2.

FIGURE 4 is a side elevation of a complete machine which may be utilized in performing the method of the present invention, the equipment for handling the legs of the crab having been broken away to avoid repetition as it is similar in all respects to FIGURE 1. Above the crab leg portion is the portion of the machine particularly adaptable for squeezing the meat from the leg knuckles and the claws of the king crab.

FIGURE 5 is a diagrammatic view illustrating the plurality of conveying belts and the drive and guiding means therefor used in conveying the knuckles and claws to the roller feeding position.

FIGURE 6 is an enlarged top plan view of the resilient guide means, of which five units in all are employed.

FIGURE 7 is a diagrammatic view illustrating the rollers, the leg conveying belts, the troughs for the meat and the shell and the water jets, all in proper relationship to clearly show the relationship which is not very clearly shown on the detailed drawings because of the great amount of detail required.

FIGURE 8 is a diagrammatic view in elevation and taken from the side, as is FIGURE 7, showing the arrangement of the belts, the rollers, the water jet and the meat and shell removing troughs as used in handling the knuckles and claws of king crabs.

FIGURE 9 is a longitudinal sectional view through that portion of a king crab leg which provides the bulk of the edible meat of the crab. The view is to illustrate the shape of the leg so that the method of removing the meat therefrom will be better understood, and more particularly to illustrate the heavy tendons through which the meat is attached as muscle to operate the joints of the crab leg.

FIGURE 10 is generally referred to as the knuckle of the crab leg and is the portion that forms the swivel-like joint between the crab leg and the crab body. This is normally broken off as illustrated in FIGURE 10 and handled separately in the cleaning operation.

FIGURE 11 is an illustration of the right claw of the king crab.

FIGURE 12 is an illustrative view showing the left claw which habitually is smaller in size than the master claw shown in FIGURE 11.

FIGURE 13 is a cross-sectional view taken along the line 13—13 of FIGURE 3.

In the device illustrated in the drawings, which is suitable for performing the method of the present invention, it is desirable to have a substantial metal fabricated frame indicated generally by the numeral 10. This frame is provided with a plurality of vertical members 12 and a number of transverse members 13 and longitudinal members 14. The transverse members, in addition to completing the framework, provide the mounting means for much of the equipment, including the motor M. The simplest form of the machine is illustrated in FIGURE 1 and this machine provides the essential mechanism and associated parts for squeezing the meat out of the long king crab legs, whose conformation is indicated at 15 in FIGURE 9. These legs are relatively long, usually 18 to 20 inches in overall length. FIGURE 4 illustrates means which may be employed in the method of this invention for squeezing the meat out of the knuckles, which are the ends of the legs forming the joints where they are secured to the central body of the crab. These knuckles are often an inch and a half or more in diameter, whereas the average diameter of the crab leg itself varies from about one-half inch at the small end to an inch at the large end where the knuckle is broken off. In addition to the thick knuckle portions, the claws of the crab, as is common also with the Dungeness and similar types of crabs, are relatively short, but again quite thick in diameter. Experience has shown that it is impractical in many instances to utilize the same set of rollers for removing the meat, both from the crab legs and from the thicker portions, such as the knuckles and claws. Further, as the crab legs are given to the workmen, they are normally complete and the knuckles are broken off the leg. It is consequently most economical of both time and effort if the leg can be fed between the rollers of one set and the knuckles and claws fed between the rollers of another set within easy reach of the individual handling the complete leg. It is for this reason that one of the preferred forms of the equipment, as shown in FIGURE 4, is a combination including two sets of rollers which can be utilized selectively for the expeditious removal of the meat from the entire crab legs, including the claws.

The rollers best suited for removing the meat from the crab legs are illustrated in FIGURES 1, 2 and 3, FIGURE 1 being a side elevation partly broken away, FIGURE 2 being a top plan view, and FIGURE 3 a cross-sectional view taken along the line 3—3 of FIGURE 2. Revolvably mounted in bearings secured to the vertical frame members 12 are two rubber-faced rolls 16 and 18. These rolls are normally run with their peripheries in reasonably firm contact to provide a V at 19, shown best in FIGURE 7, so that the rolls can engage the very tip of the crab legs which are long and tapering and finally end in a very small point 17. A reasonably small diameter is indicated as desirable for these rolls with a four inch outside diameter proving quite satisfactory in use. Rollers of this diameter have the facility for crushing the shell of the crab leg at a reasonably sharp angle so that its pressure has the effect of being applied at the end of the meat column, rather than on each side of the crab leg where it might tend to crush the meat and break it into undesirably small particles. The covering for the rolls may be any resilient material having the general properties of No. 20 temper of Neoprene rubber. It is of course well known that there are many excellent substitutes for rubber, among the synthetics or plastics. It is essential that the material be relatively dense so that there are no voids which would tend to fill up with small particles of crabmeat and the like. A controlling minimum thickness of the rubber covering is the fact that the two rubber coverings, one on roller 16 and the other on roller 18, must be capable of resiliently surrounding the crab leg sufficiently to grip it and feed it between the rollers. Also, to enable the covering of the rollers to yield sufficiently for the leg joints to pass between the rollers, each covering should be in excess of one-half of an inch in thickness so that the combined thickness of the rubber layers on the two rollers would be equal to at least one inch. These coverings are indicated at 20 and 21.

The rollers are preferably provided with end bearings and revolvably supported in block type bearings, slidable in the slot 22 in the vertical frame member 12. These bearings have not been fully illustrated as such constructions are believed to be very well known. A satisfactory method is to have the bearings for the shaft of roller 18 come to the lower end of slot 22 with the bearings for roller 16 sliding down slot 22 until the peripheries of the rubber rolls engage each other. A follower screw 24 is then tightened so that the upper bearings cannot be raised if, for instance, four legs should enter the machine at the same time. Otherwise these legs might tend to separate these two rollers. Screw 24 is preferably threaded into the fixed-in place threaded block 26. In this connection it is found that it is not desirable to employ any resilient member in this assembly which might permit the rollers to spread apart; but rather to provide and rely upon adequate resiliency of the coating of both rollers so that each part of the crab leg will be fully engaged as it passes between the rollers and thus a complete expulsion of the meat will be achieved.

Any form of motor drive may be employed for driving rolls 16 and 18; the one illustrated in FIGURES 1, 3 and 4 has proven quite satisfactory. This employs an electric motor M which drives the reduction gear element 28 so that a high torque factor is obtained. A sprocket 29 is fixedly secured to the shaft of roller 18 and connected to the drive sprocket 30 secured on the output shaft 27 of the reduction gear 28. The connecting chain 31 provides a flexible and adequate drive means which keeps the motor well out of the way of the work parts. Where the coacting rollers do not touch, it may be desirable to connect the rolls by coacting gears as 11 and 11a.

Supported from the end framing, composed essentially of the vertical members 12 and transverse frame members 13, are brackets to hold the meat collecting trough 32 and the shell collecting trough 33. These troughs are preferably disposed at a slight down grade so that a stream of water introduced at 34 or 35 will flush all the meat and the shell respectively outside of the machine where the shells can be disposed of by any convenient means and the meat can be collected on screens, not shown, as the water passes through the screen. Floating the meat away from the machine is highly desirable in that it does not tend to break up the large long pieces of meat which in most cases will be the entire column of meat contained in the individual leg. Having fixed, heavily powered rollers, means must be provided to prevent a workman from getting his hand or clothing between the rollers and this is amply taken care of by guide means and water spray means which will be described later.

In order to bring the crab legs to the pressure rollers, from a point away from the machine, longitudinal members 14 are provided which in turn are normally secured to both the vertical and transverse frame members 12 and 13 as by welding thereto. Journaled in bearings 36, which are secured to secondary vertical frame member 12a, is a lower pulley shaft 38 and an upper pulley shaft 40. These shafts, in the form of our machine illustrated, each have mounted thereon four belt pulleys 42. At the opposite end of the machine there are again two separate pulley shafts as 43 and 44. These shafts are provided at each side with adjustable take-up devices 45 so that the belts which are operatively supported by the shafts 38 and 44 and 40 and 43, respectively, can be adjusted for proper tension. Referring particularly to FIGURE 1, it will be noted that the upper run of platform belts 46 and the lower run of positioning belts 48 both run at the same speed, in the same direction, which is toward the meat removing pressure rollers 16 and 18. It has been found desirable to have the legs introduced at a point substantially at 50 between the two belts, and, with the shafts 43 and 44 offset as indicated in FIGURE 1, it is relatively easy to do this. When this has been done the legs are moved forwardly at considerable speed and during their travel are straightened out by the pressure of the belts and the side division members 51 which separate each of the groups of belts and side frame members 14. It is very desirable that the legs be straightened out and presented to the meat extracting rollers with the pointed tip foremost, but more particularly it is desired that the different joints of the leg be substantially axially aligned so as to minimize resistance to movement of the joints of the legs between the rollers because considerable resistance can occur if the successive joints are not aligned. Belts 46 and 48 are driven in their proper direction by the chain 52 which is driven by a separate sprocket on the reduction gear output shaft 27.

Completing the guiding means are resilient guide members, illustrated in FIGURES 1 and 13 in side elevation, and in FIGURES 2 and 6 in top plan view, FIGURE 6 showing the parts on an enlarged scale. Here it will be noted that each unit has a fixed member 56 which is secured to a pillar 57 at one end and to a transverse rod 58 at the other end. The resilient guide members, as 60 and 61, are secured only to pillar 57 and are additionally spring biased by springs 62 to provide a discharge opening for the crab legs to pass through just prior to entering the pressure rollers as at 63. This opening is just wide enough to engage the smaller end of the crab leg and the guide members are thereafter spread as the leg portions of greater size pass through the device.

Feeding of a crab leg into the crotch of the rollers 16 and 18 is best accomplished when the resilient roller facings substantially enclose the engaged portion of the crab leg, and it follows that if two crab legs were to be fed to the rollers too closely side by side sufficient wrap-around engagement to insure proper feeding of both crab legs between the rollers might not be effected. Completing the leg-processing portion of the equipment is a water supply pipe 64. To this pipe are secured a plurality of nozzles preferably mounted on a short length of flexible tubing so that the whole unit 65 can be adjusted accurately so that the water directed in between the two rolls, on the feeding side, will be sufficient to wash out any meat that might be deposited on the lower roll and to wash it into the meat collecting trough 32. This is a very desirable feature as it washes off any particle of meat from a broken or defective shell which may become loosened from the main column of meat. Otherwise, if this meat is allowed to go between the rolls there is a degree of contamination, loss of meat and interference with the satisfactory operation of the rolls on subsequently presented legs.

Referring to FIGURES 4 and 5, there is illustrated in the upper portion of FIGURE 4 the belt feeding means for the large diameter crab leg knuckles and pincer legs or claws. The rollers themselves, inasmuch as they are handling large pieces of crab legs and the like, are preferably of a larger diameter and experience to date indicates that a five inch diameter will handle the claws and knuckle portions of the same legs that are handled so satisfactorily by a four inch diameter roller. With this increased diameter it is possible to have an increased thickness of the covering and it has been further found that it is very important that the shorter pieces be carried at sufficient speed and be so presented to the rollers that they will be satisfactorily engaged with certainty. A feeding belt arrangement can carry the properly oriented parts and discharges them at sufficient speed so that they will jump across the gap between the end of the belts and the rollers. This gap is required in order to provide space for the crab meat that is expressed from the shells to fall downwardly into the meat trough 32a and so that the shells will be recovered in the shell trough 33a. To insure that larger parts will be definitely engaged between the rollers it has been found desirable to have the rollers spaced apart slightly to provide a more receptive V opening 67 and for average larger king crab parts, such as the knuckles and claws, a half-inch spacing is adequate. The lower roller 66 is mounted on a transverse shaft 68 and the upper roller 69 is mounted upon the transverse shaft 70. Similarly to the crab leg rollers, shaft 68 is a block bearing that slides down the slot 22a until the lower end is reached, limiting any further movement. Shaft 70, as before, also has a sliding bearing block which is normally used with a spacer between it and the bearing block of shaft 68 so that the hold-down screw 24a will hold the rollers as before against the possibility of their being spread apart in use.

Referring to FIGURE 5, which is a fragmentary view, showing only the belts and the belt drive and guiding means for the sake of clarity, there is shown a transverse shaft 72 which is driven by a suitable motor M2 belt or chain means indicated generally at 73. Shaft 72 is mounted at each end on suitable bearings 74 and 75, the bearings not being shown in this diagrammatic view. Disposed in spaced relationship upon shaft 72 are a plurality of belt pulleys 76 disposed to revolve about a horizontal axis and to provide the driving means for the plurality of belts forming the conveying means for the leg knuckles and the crab claws. While any number of belts may be used, it has been found convenient to have a lesser number of conveying channels that are used in the leg portion and as a result three coacting pairs of belts as 78 and 79 have been shown throughout the drawings. Each belt has its own drive pulley 76 which is mounted for revolution about a horizontal axis. Spaced inwardly but reasonably close to shaft 72 are two guide sheaves which act in cooperative pairs as 80 and 82. These have the effect of changing the position of the crab engaging runs of the belts 78 and 79 from a horizontal position to a vertical position. As a consequence of the conversion by sheaves 80 and 82, the end pulleys for the belts, indicated at 83 and 84, are disposed to revolve about vertical axes. To counteract any tendency for sheaves 80 and 82 to crowd belts 78 and 79 off their drive pulleys 76, revolvable stops 81 are provided for each belt. This arrangement provides the channel 85 for carrying the shell fish parts, and in our drawings three duplicate channels with their coacting pairs of belts are provided.

What we claim is:

1. The method of removing meat from a king crab leg, which comprises forming an opening in the shell adjacent to the large end of a king crab leg, and applying yielding pressure against the shell of such leg progressively from its small end toward its large end, and thereby progressively flattening the leg shell sufficiently to expel the meat from the leg shell lengthwise out of such opening.

2. In the method defined in claim 1, projecting a spray of water against meat expelled from the leg shell opening for washing the meat away from the shell.

3. The method of removing meat from a king crab leg, which comprises severing the leg from its root knuckle at a location adjacent to such knuckle to provide an opening in the shell adjacent to the large end of a king crab leg, and applying yielding pressure against the shell of such leg progressively from its small end toward its large end, and thereby progressively flattening the leg shell sufficiently to expel the meat from the leg shell lengthwise out of such opening.

4. The method of removing meat from a king crab leg, which comprises forming an opening in the shell adjacent to the large end of a king crab leg, pressing against the leg shell yielding pressure surfaces converging toward the small end of the leg, and progressively moving such surfaces toward each other from the small end of the leg toward its large end and thereby progressively flattening the leg shell sufficiently to expel the meat from the leg shell lengthwise out of such opening.

5. The method of removing meat from a king crab leg, which comprises forming an opening in the shell adjacent to the large end of a king crab leg, and applying roller-type pressure against the shell of such leg progressively from its small end toward its large end, and thereby progressively flattening the leg shell sufficiently to expel the meat from the leg shell lengthwise out of such opening.

6. The method of removing meat from a king crab leg, which comprises severing the leg from its root knuckle at a location adjacent to such knuckle to provide an opening in the shell adjacent to the large end of a king crab leg, and applying roller-type pressure against the shell of such leg progressively from its small end toward its large end, and thereby progressively flattening the leg shell sufficiently to expel the meat from the leg shell lengthwise out of such opening.

References Cited in the file of this patent

UNITED STATES PATENTS

| | | |
|---|---|---|
| 2,660,754 | Roshko | Dec. 1, 1953 |
| 2,683,281 | Yanus et al. | July 13, 1954 |
| 2,987,759 | Lapeyre et al. | June 13, 1961 |